(12) United States Patent
Merkel et al.

(10) Patent No.: US 7,494,613 B2
(45) Date of Patent: Feb. 24, 2009

(54) METHOD OF MANUFACTURING A CORDIERITE STRUCTURE

(75) Inventors: Gregory A. Merkel, Painted Post, NY (US); Tinghong Tao, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/651,814

(22) Filed: Jan. 10, 2007

(65) Prior Publication Data

US 2007/0107398 A1 May 17, 2007

Related U.S. Application Data

(62) Division of application No. 10/607,249, filed on Jun. 25, 2003, now Pat. No. 7,179,316.

(51) Int. Cl.
*B28B 3/20* (2006.01)

(52) U.S. Cl. .................................................. 264/631
(58) Field of Classification Search .................. 264/631
See application file for complete search history.

(56) References Cited

U.S. PATENT DOCUMENTS

| | | | |
|---|---|---|---|
| 3,950,175 | A | 4/1976 | Lachman et al. |
| 4,279,849 | A * | 7/1981 | Ogawa et al. ............... 264/631 |
| 4,280,845 | A | 7/1981 | Matsuhisa et al. |
| 4,632,683 | A | 12/1986 | Fukutani et al. |
| 5,258,150 | A | 11/1993 | Merkel et al. |
| 5,545,243 | A | 8/1996 | Kotani et al. |
| 5,853,444 | A | 12/1998 | Maier et al. ..................... 55/523 |
| 6,087,281 | A | 7/2000 | Merkel |
| 6,541,407 | B2 | 4/2003 | Beall et al. |
| 6,770,111 | B2 | 8/2004 | Morena et al. .................. 55/523 |
| 6,773,481 | B2 | 8/2004 | Noguchi et al. ................. 55/523 |
| 6,800,108 | B2 | 10/2004 | Noda ............................. 55/523 |

(Continued)

FOREIGN PATENT DOCUMENTS

EP         0 753 490         1/2002

(Continued)

OTHER PUBLICATIONS

Hashimoto et al., , "SiC and Cordierite Diesel Particulate Filters Designed for Low Pressure Drop and Catalyzed, Uncatalyzed Systems," SAE Technical Paper 2002-01-0322, p. 1-14.

(Continued)

*Primary Examiner*—Carlos Lopez
*Assistant Examiner*—Russell J Kemmerle, III
(74) *Attorney, Agent, or Firm*—Matthew B. McNutt

(57) ABSTRACT

A diesel particulate filter comprising a plugged, wall-flow honeycomb filter body composed of cordierite and having a plurality of parallel end-plugged cell channels traversing the body from a frontal inlet end to an outlet end thereof, wherein the filter exhibits a CTE (25-800° C.) of less than $13 \times 10^{-7}$/° C., a bulk filter density of less than 0.60 g/cm$^3$, a median pore diameter, $d_{50}$, of less than 25 micrometers, a porosity and pore size distribution that satisfy the relationship $P_m \leq 3.75$, wherein $P_m$ is equal to $10.2474\{1/[(d_{50})^2(\%porosity/100)]\} + 0.0366183(d_{90}) - 0.00040119(d_{90})^2 + 0.468815(100/\%porosity)^2 + 0.0297715(d_{50}) + 1.61639(d_{50}-d_{10})/d_{50}$, wherein $d_{10}$ and $d_{90}$ are pore diameters at 10% and 90% of the pore size distribution on a volumetric basis, and $d_{10} < d_{50} < d_{90}$. A method of making the same is also provided.

30 Claims, 4 Drawing Sheets

U.S. PATENT DOCUMENTS

| | | |
|---|---|---|
| 6,814,774 B2 | 11/2004 | Ishihara et al. ............... 55/523 |
| 6,818,580 B2 | 11/2004 | Kumazawa et al. ......... 501/119 |
| 6,827,754 B2 | 12/2004 | Suwabe et al. ............... 55/523 |
| 6,864,198 B2 | 3/2005 | Merkel ....................... 501/119 |
| 2003/0024219 A1 | 2/2003 | Harada et al. ................ 55/523 |
| 2003/0039598 A1 | 2/2003 | Nishimura ................. 422/177 |
| 2003/0041574 A1* | 3/2003 | Noguchi et al. .............. 55/523 |
| 2003/0093982 A1 | 5/2003 | Suwabe et al. ............... 55/523 |
| 2004/0029707 A1* | 2/2004 | Beall et al. .................. 501/119 |
| 2004/0148916 A1 | 8/2004 | Merkel ....................... 55/523 |
| 2004/0152593 A1 | 8/2004 | Cutler et al. ................ 502/439 |

FOREIGN PATENT DOCUMENTS

| | | |
|---|---|---|
| WO | WO 01/91882 | 6/2001 |
| WO | 02/41972 | 5/2002 |

OTHER PUBLICATIONS

Nakatani et al., , "Simultaneous PM and NOx Reduction System for Diesel Engines", SAE Technical Paper 2002-01-0957, p. 1-10.

* cited by examiner

METHOD OF MANUFACTURING A CORDIERITE STRUCTURE

The present invention is a divisional application of U.S. patent application Ser. No. 10/607,249 to Gregory A. Merkel et al., filed Jun. 25, 2003 and entitled "Cordierite Filters with Reduced Pressure Drop", issued as U.S. Pat. No. 7,179,316.

BACKGROUND OF THE INVENTION

The present invention relates to diesel particulate filters, and in particular to cordierite wall-flow diesel particulate filters having high filtration efficiency, high strength and low pressure drops for catalyzed and uncatalyzed applications.

Porous, wall-flow ceramic filters have been utilized for the removal of carbonaceous soot particles from the exhaust stream of diesel engines since the early 1980s. A porous ceramic diesel particulate filter (DPF) ideally combines low CTE (for thermal shock resistance), low pressure drop (for engine efficiency and fuel economy), high filtration efficiency (for removal of most particles from the exhaust stream), high strength (to survive handling, canning, and vibration in use), and low cost. Cordierite has satisfied these requirements; however, benefit would be gained by further reducing the pressure drop of commercially available cordierite DPFs.

During use, the pressure drop of a ceramic filter increases as diesel particulate material or carbon soot is deposited within the filter. Typically, during the deposition of the first 0.5 to 1.0 gram/liter of soot, the increase in pressure drop is especially rapid. This has been attributed to the penetration of soot into the surface and near-surface pores of the filter walls. The presence of soot within the filter walls lowers the overall permeability of the wall, thereby increasing the resistance of gas flow through the wall and increasing the pressure drop across the filter. Once the surface and near-surface pores are filled with the porous soot deposit, additional soot accumulates on the outer surface of the walls of the inlet channels as a discrete porous soot layer, or "soot cake." Although the permeability of this soot layer is very low, the rate of increase in pressure drop per unit mass of deposited soot is actually lower during the soot layer formation stage than during the initial stage in which soot penetrates the filter wall. Periodically, the soot must be burned out of the filter, in situ, in order to prevent clogging of the filter and to restore the filter to a low pressure drop state. This process is known as "regeneration" of the filter.

A recent trend in pollution control for diesel engines has been the application of a catalyst system to the DPF in order to promote the conversion of carbon monoxide and unburned hydrocarbons in the exhaust stream to carbon dioxide and water. These catalyst systems are generally comprised of a mixture of a highly dispersed noble metal catalyst supported on a high surface area metal oxide. The catalyst system may be present as a "washcoat" on the outer surfaces of the filter wall, but more typically resides primarily within the pores of the filter walls, where the oxides+metals form a thin coating that lines the surfaces of the pore walls.

In addition to catalyzing gas reactions, the catalysts can serve to lower the temperature at which the accumulated soot undergoes combustion during regeneration or can otherwise facilitate the regeneration of the filter. Regeneration of the filter requires that the temperature of the exhaust stream entering the filter be raised to the point at which the soot begins to burn. Various strategies have been adopted to provide this energy, all of which reduce the fuel efficiency of the vehicle. Thus, by reducing the energy that must be supplied in order to light-off of the soot, the catalyst can provide benefits in fuel efficiency and cost savings over the life of the vehicle.

It has been observed, however, that the application of a catalyst system to a DPF causes an increase in the pressure drop across the clean and soot-loaded filter. This is due to a reduction in the porosity and a change in the pore size distribution and pore connectivity of the filter with the application of the catalyst system. This change in pore microstructure reduces the permeability of the clean wall prior to soot loading, and also reduces the permeability of the soot-containing wall for any given mass of soot. In attempting to offset an increase in pressure drop observed in catalyzed filters it has been suggested to increase the porosity and median pore size. However, this combination of high porosity and large pore size causes lower filtration efficiency and lower mechanical strength, and does not yield an optimized filter. Furthermore, non-uniform distribution of the catalyst can result from broad pore size distributions.

A high-porosity cordierite DPF that provides a lower pressure drop in both the catalyzed and uncatalyzed state relative to filters that have been previously demonstrated, while maintaining high filtration efficiency and sufficient mechanical strength, would be an advancement in the art. The present invention provides such a cordierite DPF and a method of making the same.

SUMMARY OF THE INVENTION

In one aspect of the invention there is provided a diesel particulate filter comprising a plugged, wall-flow honeycomb filter body composed of cordierite and having a plurality of parallel end-plugged cell channels traversing the body from a frontal inlet end to an outlet end thereof, wherein the filter exhibits: (a) a CTE (25-800° C.) of less than $13 \times 10^{-7}/°$ C., preferably less than $10 \times 10^{-7}/°$ C., more preferably less than $7 \times 10^{-7}/°$ C., even more preferably greater than $4 \times 10^{-7}/°$ C. and less than $13 \times 10^{-7}/°$ C., even more preferably greater than $4 \times 10^{-7}/°$ C. and less than $10 \times 10^{-7}/°$ C., and even more preferably greater than $4 \times 10^{-7}/°$ C. and less than $7 \times 10^{-7}/°$ C.; (b) a bulk filter density of less than 0.60 g/cm$^3$; (c) a median pore diameter, $d_{50}$, of less than 25 micrometers, and a porosity and pore size distribution that satisfy the relationship $P_m \leq 3.75$, preferably $P_m \leq 3.50$, preferably $P_m \leq 3.30$, wherein $P_m$ is equal to $10.2474\{1/[(d_{50})^2(\%porosity/100)]\} + 0.0366183 (d_{90}) - 0.00040119(d_{90})^2 + 0.468815(100/\%porosity)^2 + 0.0297715(d_{50}) + 1.61639(d_{50} - d_{10})/d_{50}$, wherein $d_{10}$, and $d_{90}$ are pore diameters in micrometers at 10% and 90% of the pore size distribution based upon volume, and $d_{10} < d_{50} < d_{90}$. The inventive diesel particulate filter is suitable for both catalyzed and uncatalyzed applications. Preferred embodiments of the inventive diesel particulate filter are further described below.

In another aspect of the invention there is provided a method of making a cordierite structure for use in a diesel particulate filter, the method comprising: forming a mixture of cordierite-forming raw materials, a pore former and organic components, the cordierite-forming raw materials including talc, silica, an alumina-forming source, and optionally kaolin, each defining a median particle size, wherein the talc median particle size, the alumina-forming source median particle size, the pore former, and a pore former median particle size satisfy the relationship $R_m \leq -2.64$, where $R_m$ is equal to $[-0.102(\text{talc median particle diameter}) + 0.001466 (\text{talc median particle diameter})^2 - 0.0491((\text{weight percent super-addition of pore forming agent})/(\text{density of pore forming agent})) - 0.00762(\text{median particle diameter of pore forming agent}) + 0.0000760(\text{median particle diameter of pore forming agent})^2 - 0.0562(\text{median particle diameter of the alu-}$ mina-forming source)]; shaping the mixture into a green structure; and, firing the green structure at a temperature and for a time to produce a fired structure. Median particle diameters are in micrometers and density is in grams per cubic centimeter. Preferred embodiments of the inventive forming method are further described below.

BRIEF DESCRIPTION OF THE DRAWINGS

A complete understanding of the present invention may be obtained by reference to the accompanying drawings, when considered in conjunction with the subsequent detailed description, in which.

DETAILED DESCRIPTION OF THE INVENTION

Figure 1:
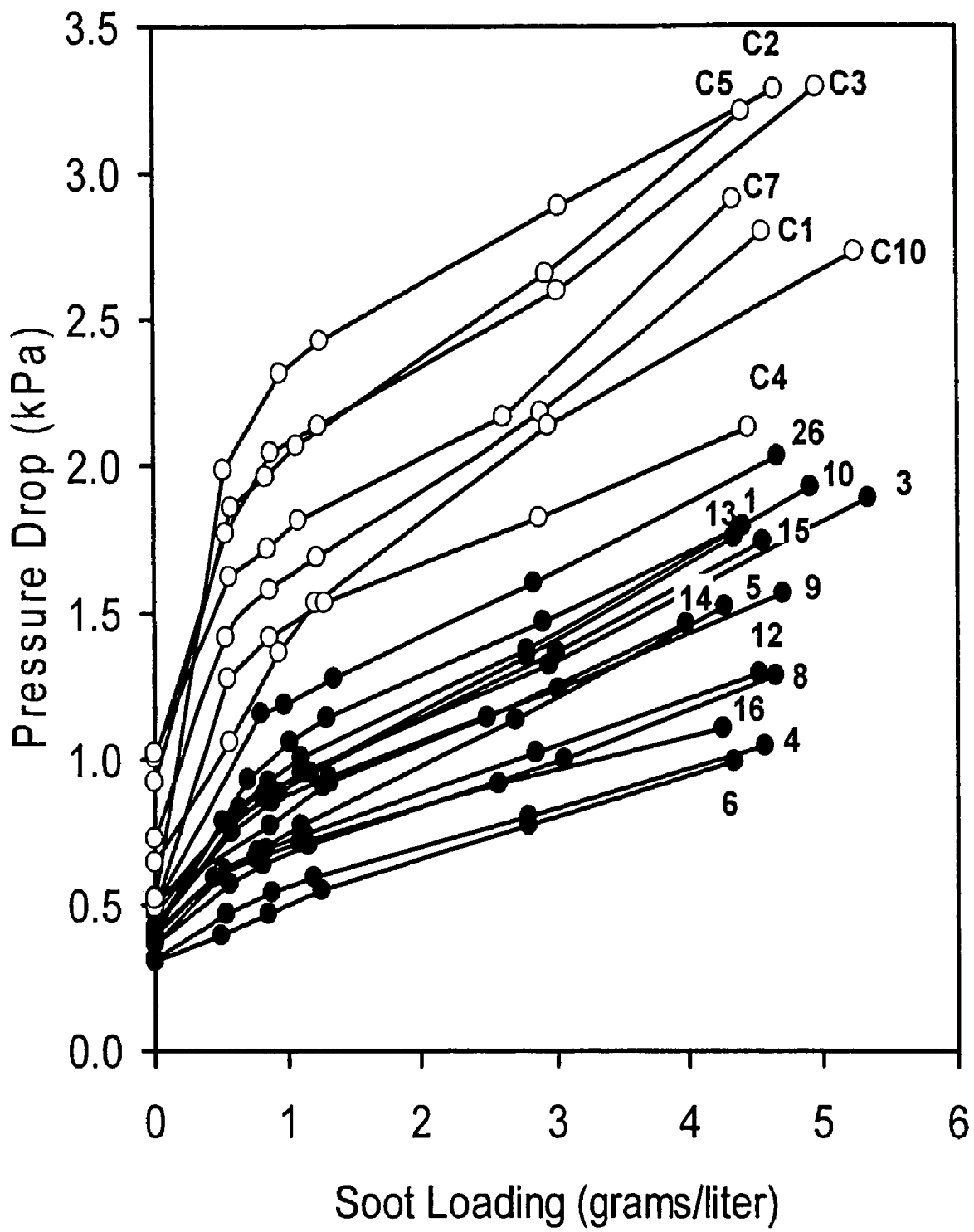
FIG. 1 is a graphical representation of the pressure drop value between the inlet and outlet ends of comparative filters (open circles) and inventive filters (filled circles), measured at a flow rate of 11.25 scfm of air at 25° C., as a function of the amount of dry, artificial carbon soot that was previously loaded into the filter at a flow rate of 15 scfm; all filters have approximately the same external dimensions (2 inches diameter, 6 inches long) and about the same cell densities (165-215 cells/in$^2$)

Cordierite diesel particulate filters according to the present invention have an enhanced pore microstructure that is optimized for pore connectivity and uniform pore size distribution that results in significant reduction in pressure drop while maintaining mechanical strength and high filtration efficiency. Accordingly, the porosity and pore size distribution satisfy the relationship $P_m \leq 3.75$, in which $P_m$ is computed as $10.2474\{1/[(d_{50})^2 (\%Porosity/100)]\} + 0.0366183(d_{90}) - 0.00040119(d_{90})^2 + 0.468815(100/\%Porosity)^2 + 0.0297715(d_{50}) + 1.61639(d_{50} - d_{10})/d_{50}$. The values of $d_{10}$, $d_{50}$ and $d_{90}$ are in units of micrometers, %porosity is dimensionless, where pore sizes and porosity are measured by mercury porosimetry. The values of $d_{10}$, $d_{50}$, and $d_{90}$ are the pore diameters at 10%, 50%, and 90% of the total pore size distribution on a volumetric basis. Specifically, $d_{10}$ is the pore diameter at 90% cumulative mercury intrusion volume, $d_{50}$ is the pore diameter at 50% cumulative mercury intrusion volume, and, $d_{90}$ is the pore diameter at 10% cumulative mercury intrusion volume. Thus, 10% of the pores are smaller than $d_{10}$, 50% of the pores are smaller than $d_{50}$, and 90% of the pores are smaller than $d_{90}$, on a volumetric basis. The value of $d_{50}$ is less than 25 µm.

In order to achieve lowest soot-loaded pressure drops, the value of $P_m$ is preferably not greater than 3.50, and more preferably not greater than 3.30. To achieve the excellent pore connectivity that is associated with low soot-loaded pressure drop and low values of $P_m$, the %porosity is preferably not less than 53%, more preferably not less than 56%, and most preferably not less than 59%. Likewise, the value of $(d_{50}-d_{10})/d_{50}$ is preferably not greater than 0.60, more preferably not greater than 0.50, and most preferably not greater than 0.45. For high filtration efficiencies and high strength, the value of $d_{50}$ is preferably less than 20 µm, more preferably less than 15 µm, and most preferably less than 12 µm. For similar reasons, the value of $d_{90}$ is preferably less than 40 µm, more preferably less than 30 µm, and most preferably less than 20 µm.

The inventive filters further exhibit a CTE (25-800° C.) of less than $13 \times 10^{-7}/°$ C., preferably less than $10 \times 10^{-7}/°$ C., more preferably less than $7 \times 10^{-7}/°$ C., even more preferably greater than $4 \times 10^{-7}/°$ C. and less than $13 \times 10^{-7}/°$ C., even more preferably greater than $4 \times 10^{-7}/°$ C. and less than $10 \times 10^{-7}/°$ C., and even more preferably greater than $4 \times 10^{-7}/°$ C. and less than $7 \times 10^{-7}/°$ C., and a bulk filter density of less than 0.60 g/cm$^3$. A high a modulus of rupture, as measured by the four-point method on a cellular bar cut parallel to the direction of the channels, is also provided of preferably at least 200 psi, more preferably at least 250 psi, and most preferably at least 300 psi.

In an embodiment, the inventive cordierite diesel particulate filter exhibits a CTE (25-800° C.) of less than $13 \times 10^{-7}/°$ C., a bulk filter density of less than 0.60 g/cm$^3$, and a pressure drop in kPa across the filter, as measured at 25° C. and a flow rate of 11.25 scfm on a 2 inch diameter, 6 inch long filter having about 200 cpsi and a 0.012 inch wall thickness, of not more than 2.2 kPa when the filter contains 5 grams/liter of dry artificial carbon soot that was previously loaded onto the filter at a flow rate of about 15 scfm. The pressure drop as measured under these conditions is preferably not greater than 1.8 kPa, more preferably not greater than 1.5 kPa, and most preferably not greater than 1.3 kPa. The CTE (25-800° C.) is preferably less than $10 \times 10^{-7}/°$ C., more preferably less than $7 \times 10^{-7}/°$ C., even more preferably greater than $4 \times 10^{-7}/°$ C. and less than $13 \times 10^{-7}/°$ C., even more preferably greater than $4 \times 10^{-7}/°$ C. and less than $10 \times 10^{-7}/°$ C., and even more preferably greater than $4 \times 10^{-7}/°$ C. and less than $7 \times 10^{-7}/°$ C. In regards to the artificial carbon soot, the term "dry" signifies that the soot does not contain substantial amounts of adsorbed volatile organic compounds.

In another embodiment, the inventive cordierite diesel particulate filter exhibits a CTE (25-800° C.) of less than $13 \times 10^{-7}/°$ C., a bulk filter density of less than 0.60 g/cm$^3$, and a pressure drop in kPa across the filter, as measured at 25° C. and a higher flow rate of 26.25 scfm on a 2 inch diameter, 6 inch long filter having about 200 cpsi and a 0.012 inch wall thickness, of not more than 5.8 kPa when the filter contains 5 grams/liter of dry artificial carbon soot that was previously loaded onto the filter at a flow rate of about 15 scfm. The pressure drop as measured under these conditions is preferably not greater than 5.0 kPa, more preferably not greater than 4.5 kPa, and most preferably not greater than 4.0 kPa. The CTE (25-800° C.) is preferably less than $13 \times 10^{-7}/°$ C., more preferably less than $7 \times 10^{-7}/°$ C., even more preferably greater than $4 \times 10^{-7}/°$ C. and less than $13 \times 10^{-7}/°$ C., even more preferably greater than $4 \times 10^{-7}/°$ C. and less than $10 \times 10^{-7}/°$ C., and even more preferably greater than $4 \times 10^{-7}/°$ C. and less than $7 \times 10^{-7}/°$ C.

The present invention also includes a wall-flow filter comprising a cordierite body having a CTE (25-800° C.) of less than $13 \times 10^{-7}/°$ C., a bulk filter density of less than 0.60 g/cm³, and a pressure drop at 1.0 gram/liter of soot loading that is not more than 0.75 kPa greater than the pressure drop of the clean (soot-free) filter when the pressure drop is measured at about 25° C. at a flow rate of 11.25 scfm across a 2-inch diameter by 6-inch long portion of a filter having about 200 cells/inch² and a wall thickness of about 0.012 inches, and the soot is an a dry artificial soot that was previously loaded onto the filter at a flow rate of 15 scfm. The pressure drop difference as measured under these conditions is preferably less than 0.6 kPa, more preferably less than 0.5 kPa, and most preferably less than 0.4 kPa. The CTE (25-800° C.) is preferably less than $10 \times 10^{-7}/°$ C., more preferably less than $7 \times 10^{-7}/°$ C., even more preferably greater than $4 \times 10^{-7}/°$ C. and less than $13 \times 10^{-7}/°$ C., even more preferably greater than $4 \times 10^{-7}/°$ C. and less than $10 \times 10^{-7}/°$ C., and even more preferably greater than $4 \times 10^{-7}/°$ C. and less than $7 \times 10^{-7}/°$ C.

There is also provided a method for fabricating the inventive cordierite structure or body by forming a mixture from certain inorganic raw materials having specific particle size restrictions. The inorganic raw materials include talc, silica, and an alumina-forming source. Optionally, the raw material mixture may also contain kaolin. Raw materials are blended together with a pore forming agent, and organic constituents that may include plasticizers, lubricants, and binders. Water is generally added as the solvent. The mixture is shaped into a green body, optionally dried, and then fired to form the product structure.

Regarding the inorganic raw materials, the talc, preferably platy (i.e., having a platelet particle morphology), has a median particle size of between 5 and 35 μm, the silica has a median particle size of between 1 and 35 μm, and the alumina source has a median particle size of between 1 and 18 μm. The alumina source is any material that, when heated, is convertible to $Al_2O_3$, such as but not limited to corundum, aluminum hydroxide, aluminum oxide hydroxide (such as boehmite), and so-called transition aluminas such as gamma-alumina and rho-alumina. If more than one alumina source is used the median particle size is computed as $[w_1(d_{50})_1 + w_2(d_{50})_2 + \ldots + w_n(d_{50})_n]/[w_1 + w_2 + \ldots + w_n]$ where $w_i$ represents the weight percentage of each alumina source and $(d_{50})_i$ is the median particle diameter of the respective alumina source. If kaolin is added it is preferred that the raw material mixture contain not more than about 10 weight percent kaolin, and especially not more than about 5 weight percent kaolin. All particle sizes are measured by a laser diffraction technique.

The pore former may be any natural or synthetic material capable of forming relic pores by evaporation or combustion during firing, such as carbon, coke, graphite, starch, flour, cellulose, or a synthetic organic polymer such as a polyacrylate, polyethylene, or polystyrene. The morphology of the pore forming agent may be platey, fibrous, spheroidal, or other shape. The median particle diameter of the pore forming agent is between 5 μm and 90 μm, preferably between 7 μm and 60 μm, and more preferably between 20 and 50 μm. The pore former is added as a super-addition such that the weight percent super-addition of pore forming agent is computed as 100(mass of pore forming agent)/(mass of cordierite-forming raw materials). All particle sizes are measured by a laser diffraction technique.

According to the present invention, the talc particle size, the median particle size of the combined alumina sources, the amount of pore former, and the median particle size of the pore former satisfy the relation $R_m \leq -2.64$, where $R_m$ is the raw material parameter defined as being equal to [−0.102(talc median particle diameter)+0.001466(talc median particle diameter)²−0.0491((weight percent super-addition of pore forming agent)/(density of pore forming agent))−0.00762 (median particle diameter of pore forming agent)+0.0000760 (median particle diameter of pore forming agent)²−0.0562 (median particle diameter of the alumina sources)]. In the definition of $R_m$, particle diameters are in units of microns as measured by a laser diffraction technique, and density is in units of grams per cubic centimeter.

The inorganic raw materials and pore former are intimately blended with a solvent, and forming aids which impart plastic formability and green strength to the raw materials when they are shaped into a body. Forming may be done by, for example, molding or extrusion. When forming is done by extrusion, most typically methyl cellulose serves as a binder, and sodium stearate serves as a lubricant. The relative amounts of forming aids can vary depending on factors such as the nature and amounts of raw materials used, etc. For example, the typical amounts of forming aids are 2% to 10% by weight of methyl cellulose, preferably 3% to 6% by weight, and 0.5% to 2% by weight sodium stearate, preferably 0.6% to 1% by weight. The inorganic raw materials, pore former and the forming aids are mixed together in dry form and then mixed with water as the solvent. The amount of water can vary from one batch of materials to another and therefore is determined by pre-testing the particular batch for extrudability.

The resulting plastic mixture is then shaped into a green body, preferably a honeycomb structure. The honeycomb structure has an inlet and outlet end or face, and a multiplicity of cells extending from the inlet end to the outlet end, the cells having porous walls. The inventive filters have cellular densities from 70 cells/in² (10.9 cells/cm²) to 400 cells/in² (62 cells/cm²). Extrusion techniques are well known in the art. The green bodies are dried and then fired at a sufficient temperature and for a sufficient time to form the final product structure. The firing is preferably done by heating to a maximum temperature of 1390° to 1440° C. for 4 to 25 hours. The compositions of the present invention result in formation of a ceramic structure which is predominantly of a phase approximating the stoichiometry $Mg_2Al_4Si_5O_{18}$.

Alternate channels of the honeycomb body are plugged at one end, either as part of the honeycomb-forming process, or after drying the unfired body, or after firing the body to form cordierite. A first portion of the cells at the inlet end or face are plugged at the ends, and a second portion of cells at the outlet end or face different from the inlet end cells are additionally plugged so that each cell of the structure is plugged only at one end. The preferred arrangement is to have every other cell on a given face plugged in a checkered pattern.

To more fully illustrate the invention, the following non-limiting examples are presented below. All parts, portions and percentages are on a weight basis unless otherwise stated.

EXAMPLES

Inventive and comparative examples are prepared by mixing together selected raw materials from Table 1 in the proportions listed for the examples in Tables 2 to 8. 100 parts by weight of the dry ingredients (oxides plus pore formers) are mixed with about 4 to 6 parts by weight methyl cellulose and 0.5 to 1 part by weight sodium stearate. The contents are then plasticized with about 25 to 40 parts by weight deionized water, and are extruded into honeycomb having a nominal cell density of 200 cells/inch² and a wall thickness of 0.012 inches to 0.020 inches. The honeycombs are dried and subsequently fired to a temperature of 1405° C. to 1415° C., held at that temperature for 11 to 25 hours, and then cooled to room temperature.

Properties of comparative (non-inventive) examples are provided in Tables 2 and 3, and properties of inventive examples are given in Tables 4 to 8. Pore volume, %porosity, and pore size distribution are measured by mercury porosimetry. Coefficient of thermal expansion along the axial direction (parallel to the length of the channels) is measured by dilatometry. Modulus of rupture is measured by the four-point method on honeycomb bars cut parallel to axial direction of the filter. The filter bulk density is estimated from the cell density, wall thickness, and porosity of the materials, assuming a plug depth of 5 mm.

Some parts that are approximately 5 cm diameter by approximately 15 cm are plugged at the ends of alternate channels on the opposite faces in a checkered pattern such that a channel that is plugged at one end is open at the other end, thereby forming a wall-flow filter. Pressure drop across the length of the filter is measured at ambient temperature at air flow rates of 11.25 and 26.25 standard cubic feet per minute (scfm). These flow rates are equivalent to 0.319 and 0.743 normal cubic meters per minute, Nm³/min, respectively. They are also equal to space velocities of approximately 62000 and 144000 hours$^{-1}$, respectively.

The filters are then progressively loaded with dry, artificial high surface area carbon soot at a flow rate of approximately 15 scfm (space velocity approximately 85000 hr$^{-1}$) and at loadings from about 0.5 grams/liter to about 4.5 grams/liter, and the pressure drops are measured at 11.25 and 26.25 scfm for each soot loading. The pressure drop versus soot loading curves for the inventive and comparative examples are shown in FIG. 1. It is evident that the unique pore microstructures of the inventive bodies enable a much lower rate of pressure drop increase with increasing soot loading than the comparative examples. Comparative filters have higher pressure drops because they do not meet both requirements that the bulk filter density be less than 0.60 g/cm³ and that the value of $P_m$ be no greater than 3.75. The inventive examples are seen to have a much more gradual increase in pressure drop versus soot loading during loading of the initial 1 gram/liter of soot. This results in much lower pressure drops at all higher soot loadings as well.

Figure 2:
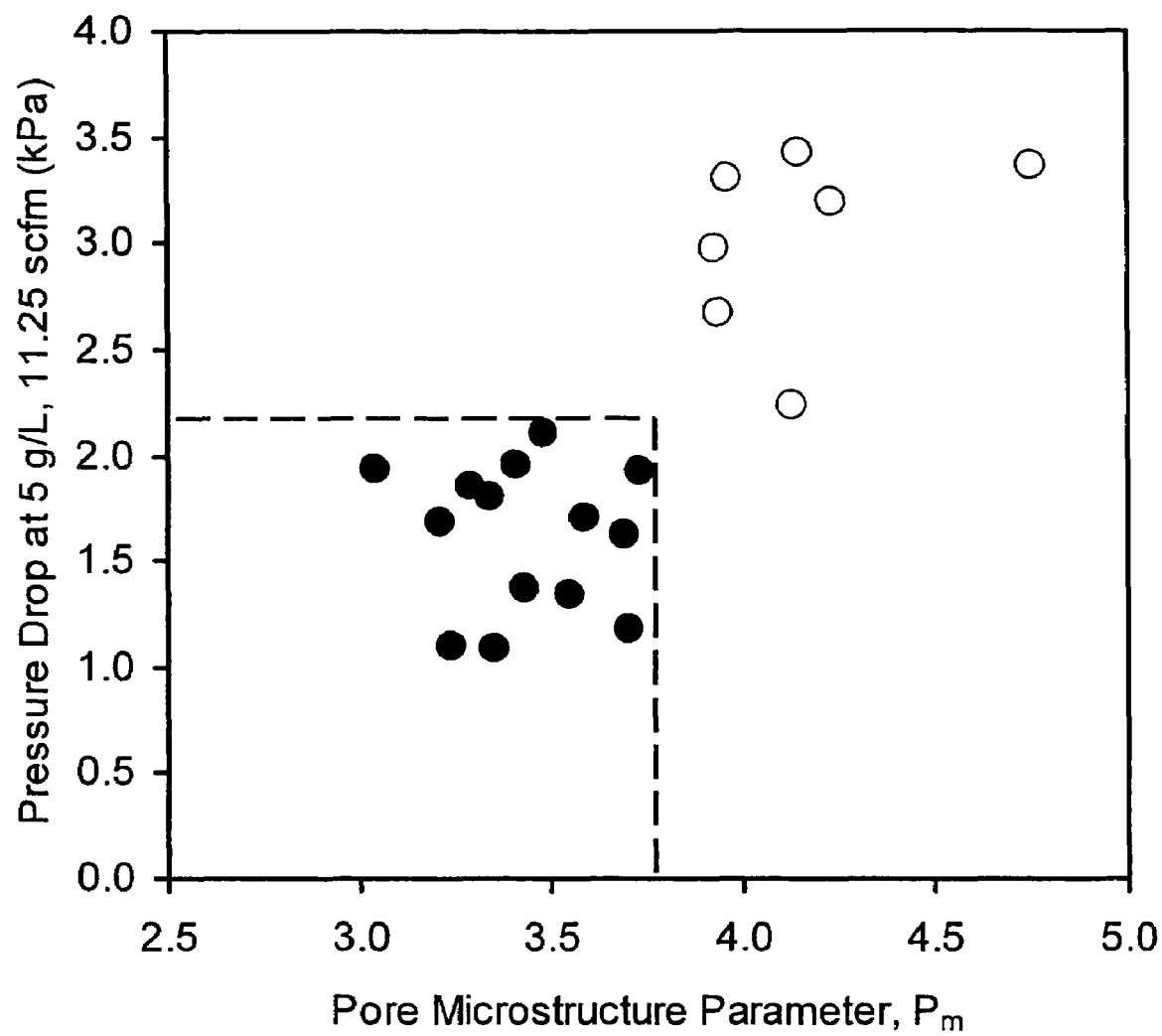
FIG. 2 is a graphical representation of the pressure drop value between the inlet and outlet ends of comparative filters (open circles) and inventive filters (filled circles), measured at a flow rate of 11.25 scfm of air at 25° C. on 2 inch diameter by 6 inch long filters (165-215 cpsi) and at 5 grams/liter dry artificial carbon soot loading (deposited at a flow rate of 15 scfm), versus the pore microstructure parameter $P_m$.

The extrapolated pressure drops at 5 g/l soot loading and 11.25 scfm flow rate are plotted versus the pore microstructural parameter, $P_m$, in FIG. 2. It is evident that when the value of the parameter $P_m$ is not more than 3.75 and bulk density of the filter is less than 0.60 g/cm³, the soot-loaded pressure drop of the filter is of a desirable low value.

Figure 3:
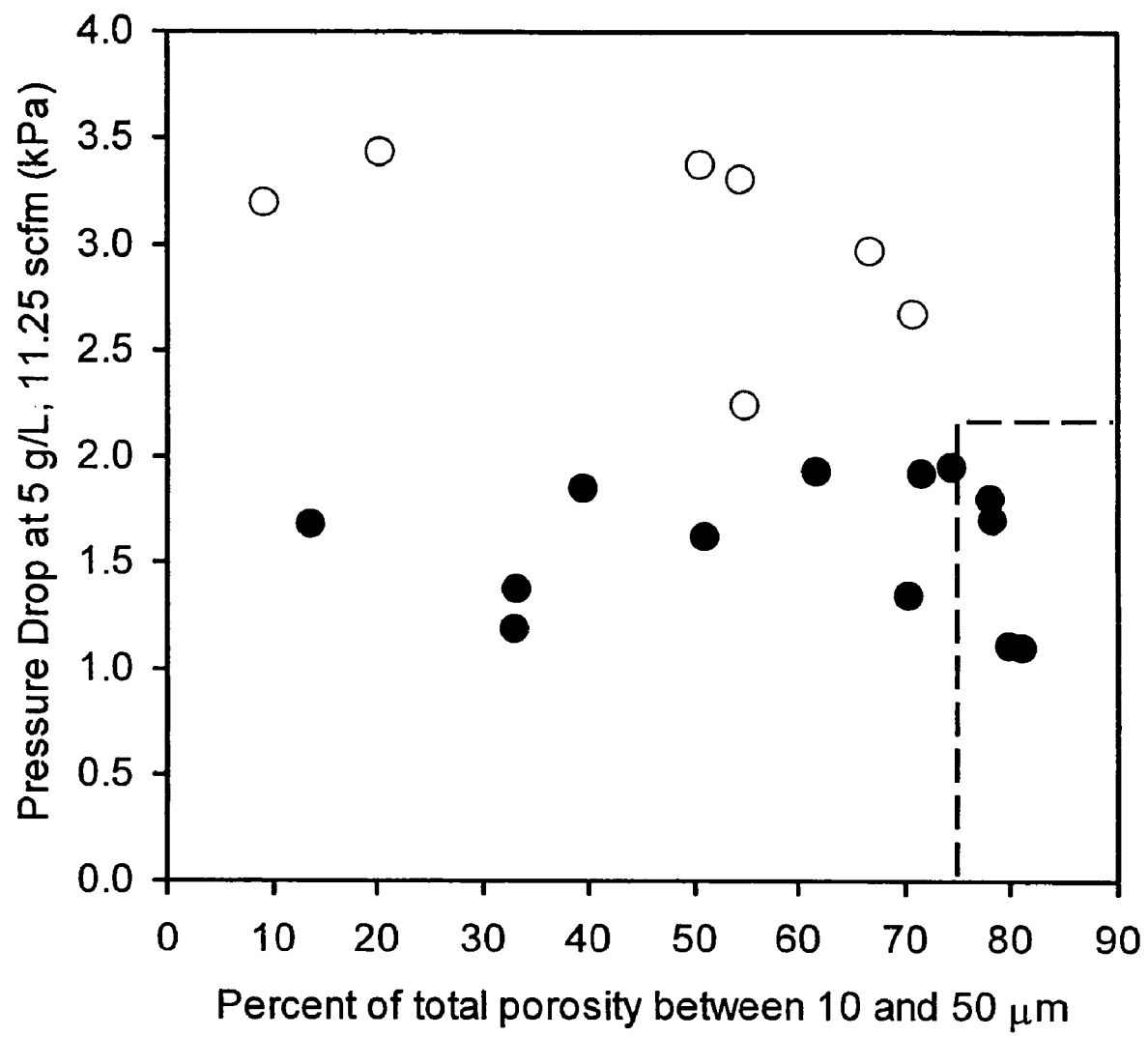
FIG. 3 is a graphical representation of the pressure drop value between the inlet and outlet ends of comparative filters (open circles) and inventive filters (filled circles), measured at a flow rate of 11.25 scfm of air at 25° C. on 2 inch diameter by 6 inch long filters (165-215 cpsi) and at 5 grams/liter dry artificial carbon soot loading (deposited at a flow rate of 15 scfm), versus the percent of the total porosity that lies between 10 and 50 µm; and, FIG. 4 is a graphical representation of the relationship between the pressure drop value between the inlet and outlet ends of comparative filters (open circles) and inventive filters (filled circles), measured at a flow rate of 11.25 scfm of air at 25° C. on 2 inch diameter by 6 inch long filters (165-215 cpsi) and at 5 grams/liter dry artificial carbon soot loading (deposited at a flow rate of 15 scfm), versus the raw material parameter $R_m$.

The extrapolated pressure drops at 5 g/l soot loading and 11.25 scfm flow rate are also plotted versus the percentage of total porosity between 10 and 50 μm in FIG. 3. It is apparent that very low pressure drops can be achieved even when the amount of porosity between 10 and 50 μm is much less than 75% of the total amount of porosity in the ceramic. Thus, the pressure drop of a filter cannot be predicted from the amount of porosity between 10 and 50 μm.

Figure 4:
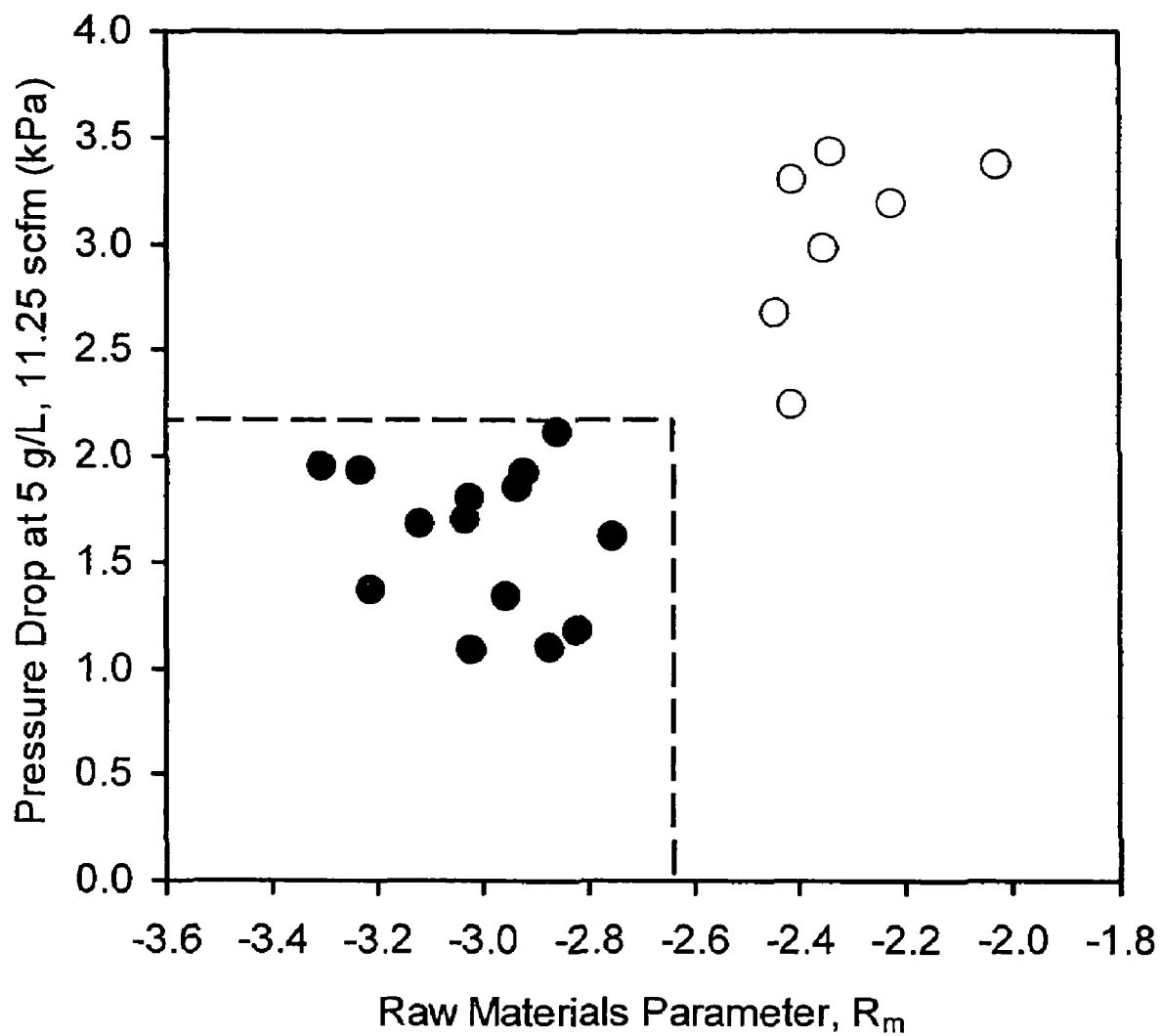

The extrapolated pressure drops at 5 g/l soot loading and 11.25 scfm flow rate are plotted versus the raw material parameter, $R_m$, in FIG. 4. It is seen that when the raw materials and pore forming agent are selected according to the present invention so that the value of $R_m$ is not more than −2.64, the soot-loaded pressure drop is desirably low.

Therefore, the present invention is advantageous in providing a lower pressure drop cordierite diesel particulate filter relative to commercially available filters due to improved pore connectivity. The improved pore connectivity is a consequence of the narrow pore size distribution and high %porosity. The inventive filters are especially suitable for applications in which the filter is coated with a catalyst system, however may be used in uncatalyzed applications. The lower pressure drop will enable more efficient operation of the diesel engine and improved fuel economy. Despite having a high porosity, the inventive filters possess a high filtration efficiency since a low pressure drop can be achieved without requiring coarse porosity that would allow the passage of soot particles through the filter walls. The inventive filters also have excellent strength due to the absence of coarse pores, despite a high porosity.

It should be understood that while the present invention has been described in detail with respect to certain illustrative and specific embodiments thereof, it should not be considered limited to such but may be used in other ways without departing from the spirit of the invention and the scope of the appended claims.

TABLE 1

Raw material properties

| Raw Material | Median Particle Diameter (μm) | Density of Pore Former (g/cm³) |
|---|---|---|
| Talc A | 24.2 | — |
| Talc B | 21.6 | — |
| Talc C | 15.4 | — |
| Talc D | 68.8 | — |
| Alumina A | 6.8 | — |
| Alumina B | 1.8 | — |
| Aluminum hydroxide A | 13.2 | — |
| Aluminum hydroxide B | 5.0 | — |
| Boehmite | <0.15 | — |
| Kaolin | 3.2 | — |
| Silica | 23.4 | — |
| Graphite A | 124 | 2.2 |
| Graphite B | 49.0 | 2.2 |
| Graphite C | 36.3 | 2.2 |
| Graphite D | 9.0 | 2.2 |
| Graphite E | 28.6 | 2.2 |
| Potato starch | 45.0 | 1.5 |
| Corn starch | 14.6 | 1.5 |
| Coconut shell flour | 36.6 | 1.3 |
| Walnut shell flour | 75 | 1.3 |
| Porous polyacrylate beads A | 8.1 | 0.8 |
| Porous polyacrylate beads B | 41.9 | 0.8 |

TABLE 2

Comparative Examples

| | Example Number | | | | |
|---|---|---|---|---|---|
| | C1 | C2 | C3 | C4 | C5 |
| Talc A | 39.96 | 40.7 | 40.7 | 40.7 | 0 |
| Talc B | 0 | 0 | 0 | 0 | 40.7 |

TABLE 2-continued

Comparative Examples

| | Example Number | | | | |
|---|---|---|---|---|---|
| | C1 | C2 | C3 | C4 | C5 |
| Alumina A | 21.54 | 0 | 0 | 0 | 0 |
| Alumina B | 0 | 14.8 | 14.8 | 14.8 | 14.8 |
| Aluminum Hydroxide B | 16.35 | 16.0 | 16.0 | 16.0 | 16.0 |
| Kaolin | 0 | 16.0 | 16.0 | 16.0 | 16.0 |
| Silica | 22.15 | 12.5 | 12.5 | 12.5 | 12.5 |
| Graphite A | 0 | 20.0 | 0 | 0 | 0 |
| Graphite C | 10.0 | 0 | 0 | 0 | 20.0 |
| Graphite E | 0 | 0 | 20.0 | 20.0 | 0 |
| $R_m$ parameter | −2.35 | −2.03 | −2.41 | −2.41 | −2.34 |
| Total Intrusion (ml/g) | 0.3912 | 0.3877 | 0.4246 | 0.4181 | 0.3896 |
| % Porosity | 47.4 | 46.6 | 50.4 | 49.5 | 47.2 |
| $d_{10}$ pore size (μm) | 7.1 | 2.0 | 5.1 | 5.1 | 3.0 |
| $d_{50}$ pore size (μm) | 12.4 | 11.1 | 11.4 | 11.9 | 7.1 |
| $d_{90}$ pore size (μm) | 23.9 | 31.2 | 28.3 | 35.7 | 15.4 |
| $(d_{90} - d_{10})/d_{50}$ | 1.35 | 2.62 | 2.03 | 2.56 | 1.74 |
| $(d_{90} - d_{50})/d_{50}$ | 0.92 | 1.80 | 1.47 | 1.99 | 1.16 |
| $(d_{50} - d_{10})/d_{50}$ | 0.43 | 0.82 | 0.56 | 0.57 | 0.58 |
| $P_m$ parameter | 3.93 | 4.75 | 3.96 | 4.13 | 4.15 |
| Pore volume ≧80 μm (ml/g) | 0.0103 | 0.0120 | 0.0175 | 0.0219 | 0.0053 |
| Pore volume ≧60 μm (ml/g) | 0.0136 | 0.0164 | 0.0217 | 0.0270 | 0.0070 |
| Pore volume ≧50 μm (ml/g) | 0.0170 | 0.0216 | 0.0256 | 0.0323 | 0.0089 |
| Pore volume ≧40 μm (ml/g) | 0.0204 | 0.0268 | 0.0294 | 0.0375 | 0.0107 |
| Pore volume ≧20 μm (ml/g) | 0.0553 | 0.0800 | 0.0677 | 0.0831 | 0.0265 |
| Pore volume ≧10 μm (ml/g) | 0.2781 | 0.2176 | 0.2567 | 0.2613 | 0.0880 |
| Pore volume ≧4 μm (ml/g) | 0.3882 | 0.3121 | 0.3982 | 0.3920 | 0.3166 |
| Pore volume ≧2 μm (ml/g) | 0.3905 | 0.3499 | 0.4161 | 0.4094 | 0.3740 |
| Percent of total porosity <10 μm | 28.9 | 43.9 | 39.5 | 37.5 | 77.4 |
| Percent of total porosity >10 μm, <50 μm | 66.7 | 50.6 | 54.4 | 54.8 | 20.3 |
| Percent of total porosity >50 μm | 4.3 | 5.6 | 6.0 | 7.7 | 2.3 |
| Diameter (cm) | 5.10 | 5.05 | 4.92 | 5.02 | 5.20 |
| Length (cm) | 15.53 | 15.18 | 15.53 | 15.43 | 15.97 |
| Cells per square inch | 180.6 | 182 | 213 | 198 | 185 |
| Wall thickness ($10^{-3}$ inches) | 19.5 | 10.9 | 20.5 | 13.9 | 20.5 |
| Filter bulk density (g/cm³) | 0.68 | 0.43 | 0.70 | 0.60 | 0.71 |
| Clean pressure drop at 11.25 scfm (kPa) | 0.73 | 0.52 | 1.00 | 0.49 | 0.92 |
| Pressure drop at 1 g/L, 11.25 scfm (kPa) | 1.62 | 2.34 | 2.08 | 1.45 | 2.04 |
| Pressure drop at 5 g/L, 11.25 scfm (kPa) | 2.97 | 3.37 | 3.30 | 2.24 | 3.43 |
| Pressure drop at 10 g/L, 11.25 scfm (kPa) | 4.83 | 4.60 | 5.07 | 3.22 | 5.30 |
| Clean pressure drop at 26.25 scfm (kPa) | 2.66 | 1.61 | 3.62 | 1.63 | 2.72 |
| Pressure drop at 1 g/L, 26.25 scfm (kPa) | 4.72 | 6.05 | 6.21 | 3.85 | 5.46 |
| Pressure drop at 5 g/L, 26.25 scfm (kPa) | 8.18 | 8.81 | 9.61 | 5.97 | 9.05 |
| Pressure drop at 10 g/L, 26.25 scfm (kPa) | 12.79 | 11.93 | 14.27 | 8.50 | 13.81 |
| Pressure drop at 1 g/l soot loading minus clean pressure drop, both at 11.25 scfm (kPa) | 0.89 | 1.82 | 1.08 | 0.96 | 1.12 |
| CTE, 25-800° C. ($10^{-7}$ °C.$^{-1}$) | 9.1 | 3.5 | 4.7 | 3.5 | 6.6 |
| Modulus of rupture on cellular bar (lbs/in²) | 1136 | 320 | — | — | 600 |

TABLE 3

Comparative Examples

| | Example Number | | | | |
|---|---|---|---|---|---|
| | C6 | C7 | C8 | C9 | C10 |
| Talc A | 0 | 0 | 0 | 0 | 20.35 |
| Talc B | 0 | 40.7 | 0 | 0 | 0 |
| Talc C | 40.7 | 0 | 40.7 | 40.7 | 0 |
| Talc D | 0 | 0 | 0 | 0 | 20.35 |
| Alumina B | 14.8 | 14.8 | 14.8 | 14.8 | 14.8 |
| Aluminum Hydroxide B | 16.0 | 16.0 | 16.0 | 16.0 | 16.0 |
| Kaolin | 16.0 | 16.0 | 16.0 | 16.0 | 16.0 |
| Silica | 12.5 | 12.5 | 12.5 | 12.5 | 12.5 |
| Graphite A | 0 | 0 | 0 | 0 | 40.0 |
| Graphite C | 20.0 | 0 | 40.0 | 0 | 0 |
| Graphite D | 0 | 20.0 | 0 | 40.0 | 0 |
| $R_m$ parameter | −2.04 | −2.22 | −2.49 | −2.37 | −2.44 |
| Total Intrusion (ml/g) | 0.3838 | 0.4103 | 0.5167 | 0.4868 | 0.5624 |
| % Porosity | 45.6 | 49.1 | 52.7 | 52.7 | 59.7 |
| $d_{10}$ pore size (μm) | 3.5 | 2.2 | 4.1 | 3.7 | 6.9 |

TABLE 3-continued

Comparative Examples

| | C6 | C7 | C8 | C9 | C10 |
|---|---|---|---|---|---|
| $d_{50}$ pore size (μm) | 9.4 | 4.8 | 9.9 | 8.4 | 22.6 |
| $d_{90}$ pore size (μm) | 27.4 | 11.3 | 35.0 | 35.1 | 55.8 |
| $(d_{90} - d_{10})/d_{50}$ | 2.55 | 1.92 | 3.11 | 3.75 | 2.16 |
| $(d_{90} - d_{50})/d_{50}$ | 1.92 | 1.38 | 2.53 | 3.20 | 1.46 |
| $(d_{50} - d_{10})/d_{50}$ | 0.63 | 0.54 | 0.59 | 0.56 | 0.7 |
| $P_m$ parameter | 4.51 | 4.23 | 3.93 | 3.91 | 3.94 |
| Pore volume ≧80 μm (ml/g) | 0.0109 | 0.0074 | 0.0170 | 0.0168 | 0.0275 |
| Pore volume ≧60 μm (ml/g) | 0.0145 | 0.0091 | 0.0248 | 0.0228 | 0.048 |
| Pore volume ≧50 μm (ml/g) | 0.0191 | 0.0107 | 0.0334 | 0.0313 | 0.0777 |
| Pore volume ≧40 μm (ml/g) | 0.0237 | 0.0123 | 0.0419 | 0.0397 | 0.1073 |
| Pore volume ≧20 μm (ml/g) | 0.0603 | 0.0224 | 0.1015 | 0.0951 | 0.3243 |
| Pore volume ≧10 μm (ml/g) | 0.1774 | 0.0483 | 0.2555 | 0.2056 | 0.476 |
| Pore volume ≧4 μm (ml/g) | 0.3309 | 0.2517 | 0.4691 | 0.4247 | 0.5285 |
| Pore volume ≧2 μm (ml/g) | 0.3700 | 0.3776 | 0.5062 | 0.4779 | 0.5443 |
| Percent of total porosity <10 μm | 53.8 | 88.2 | 50.6 | 57.8 | 15.4 |
| Percent of total porosity >10 μm, <50 μm | 41.2 | 9.2 | 43.0 | 35.8 | 70.8 |
| Percent of total porosity >50 μm | 5.0 | 2.6 | 6.5 | 6.4 | 13.8 |
| Diameter (cm) | — | 5.37 | — | — | 5.08 |
| Length (cm) | — | 15.15 | — | — | 15.19 |
| Cells per square inch | — | 186 | — | — | 196 |
| Wall thickness ($10^{-3}$ inches) | — | 14.0 | — | — | 19.9 |
| Filter bulk density (g/cm$^3$) | — | 0.59 | — | — | 0.52 |
| Clean pressure drop at 11.25 scfm (kPa) | — | 1.02 | — | — | 0.65 |
| Pressure drop at 1 g/L, 11.25 scfm (kPa) | — | 1.78 | — | — | 1.4 |
| Pressure drop at 5 g/L, 11.25 scfm (kPa) | — | 3.19 | — | — | 2.67 |
| Pressure drop at 10 g/L, 11.25 scfm (kPa) | — | 5.34 | — | — | 3.96 |
| Clean pressure drop at 26.25 scfm (kPa) | — | 2.85 | — | — | 2.43 |
| Pressure drop at 1 g/L, 26.25 scfm (kPa) | — | 4.67 | — | — | 4 |
| Pressure drop at 5 g/L, 26.25 scfm (kPa) | — | 7.75 | — | — | 7.52 |
| Pressure drop at 10 g/L, 26.25 scfm (kPa) | — | 12.15 | — | — | 11.32 |
| Pressure drop at 1 g/l soot loading minus clean pressure drop, both at 11.25 scfm (kPa) | — | 0.76 | — | — | 0.75 |
| CTE, 25-800° C. ($10^{-7}$° C.$^{-1}$) | 6.4 | 3.7 | 8.1 | 8.6 | 9.4 |
| Modulus of rupture on cellular bar (lbs/in$^2$) | — | 601 | — | — | — |

TABLE 4

Inventive Examples

| | 1 | 2 | 3 | 4 | 5 | 6 |
|---|---|---|---|---|---|---|
| Talc A | 40.70 | 40.70 | 40.70 | 39.96 | 39.96 | 39.96 |
| Alumina A | 0 | 0 | 14.80 | 0 | 21.54 | 21.54 |
| Alumina B | 14.80 | 14.80 | 0 | 21.54 | 0 | 0 |
| Aluminum Hydroxide B | 16.00 | 16.00 | 16.00 | 16.35 | 16.35 | 16.35 |
| Kaolin | 16.00 | 16.00 | 16.00 | 0 | 0 | 0 |
| Silica | 12.50 | 12.50 | 12.50 | 22.15 | 22.15 | 22.15 |
| Graphite A | 60.0 | 0 | 0 | 0 | 0 | 0 |
| Graphite B | 0 | 0 | 40.0 | 40.0 | 40.0 | 0 |
| Graphite C | 0 | 0 | 0 | 0 | 0 | 40.0 |
| Graphite D | 0 | 40.0 | 0 | 0 | 0 | 0 |
| $R_m$ parameter | -2.92 | -2.76 | -3.03 | -2.87 | -3.03 | -3.02 |
| Total Intrusion (ml/g) | 0.6897 | 0.5752 | 0.6140 | 0.6307 | 0.5737 | 0.6195 |
| % Porosity | 61.6 | 59.0 | 59.9 | 62.0 | 55.4 | 60.7 |
| $d_{10}$ pore size (μm) | 5.3 | 5.0 | 9.1 | 9.3 | 8.7 | 10.0 |
| $d_{50}$ pore size (μm) | 16.9 | 13.2 | 15.4 | 15.9 | 15.8 | 17.2 |
| $d_{90}$ pore size (μm) | 38.4 | 39.9 | 45.0 | 39.2 | 35.6 | 42.2 |
| $(d_{90} - d_{10})/d_{50}$ | 1.96 | 2.64 | 2.34 | 1.87 | 1.70 | 1.88 |
| $(d_{90} - d_{50})/d_{50}$ | 1.27 | 2.01 | 1.93 | 1.46 | 1.25 | 1.45 |
| $(d_{50} - d_{10})/d_{50}$ | 0.69 | 0.62 | 0.41 | 0.41 | 0.45 | 0.42 |
| $P_m$ parameter | 3.73 | 3.66 | 3.34 | 3.24 | 3.59 | 3.35 |
| Pore volume ≧80 μm (ml/g) | 0.0203 | 0.0205 | 0.0229 | 0.0250 | 0.0184 | 0.0301 |
| Pore volume ≧60 μm (ml/g) | 0.0321 | 0.0321 | 0.0379 | 0.0362 | 0.0270 | 0.0412 |
| Pore volume ≧50 μm (ml/g) | 0.0479 | 0.0448 | 0.0538 | 0.0491 | 0.0382 | 0.0538 |
| Pore volume ≧40 μm (ml/g) | 0.0637 | 0.0574 | 0.0696 | 0.0619 | 0.0495 | 0.0663 |
| Pore volume ≧20 μm (ml/g) | 0.2491 | 0.1723 | 0.2109 | 0.2195 | 0.1570 | 0.2270 |
| Pore volume ≧10 μm (ml/g) | 0.5423 | 0.3603 | 0.5326 | 0.5531 | 0.4868 | 0.5565 |
| Pore volume ≧4 μm (ml/g) | 0.6401 | 0.5462 | 0.6110 | 0.6273 | 0.5693 | 0.6180 |

TABLE 4-continued

Inventive Examples

| | Example Number | | | | | |
|---|---|---|---|---|---|---|
| | 1 | 2 | 3 | 4 | 5 | 6 |
| Pore volume ≧2 μm (ml/g) | 0.6728 | 0.5654 | 0.6137 | 0.6302 | 0.5728 | 0.6191 |
| Percent of total porosity <10 μm | 21.4 | 37.4 | 13.3 | 12.3 | 15.1 | 10.2 |
| Percent of total porosity >10 μm, <50 μm | 71.7 | 54.9 | 78.0 | 79.9 | 78.2 | 81.2 |
| Percent of total porosity >50 μm | 6.9 | 7.8 | 8.8 | 7.8 | 6.7 | 8.7 |
| Diameter (cm) | 5.15 | — | 5.12 | 5.19 | 5.27 | 5.34 |
| Length (cm) | 15.19 | — | 15.33 | 15.05 | 15.23 | 15.19 |
| Cells per square inch | 179 | — | 189 | 164 | 183 | 167 |
| Wall thickness ($10^{-3}$ inches) | 11.3 | — | 14.1 | 13.7 | 14.2 | 12.8 |
| Filter bulk density (g/cm$^3$) | 0.31 | — | 0.40 | 0.35 | 0.44 | 0.35 |
| Clean pressure drop at 11.25 scfm (kPa) | 0.43 | — | 0.43 | 0.31 | 0.37 | 0.30 |
| Pressure drop at 1 g/L, 11.25 scfm (kPa) | 1.05 | — | 0.92 | 0.56 | 0.75 | 0.50 |
| Pressure drop at 5 g/L, 11.25 scfm (kPa) | 1.92 | — | 1.80 | 1.10 | 1.70 | 1.09 |
| Pressure drop at 10 g/L, 11.25 scfm (kPa) | 3.01 | — | 2.99 | 1.77 | 2.93 | 1.79 |
| Clean pressure drop at 26.25 scfm (kPa) | 1.60 | — | 1.57 | 1.15 | 1.37 | 1.14 |
| Pressure drop at 1 g/L, 26.25 scfm (kPa) | 3.03 | — | 2.69 | 1.70 | 2.23 | 1.55 |
| Pressure drop at 5 g/L, 26.25 scfm (kPa) | 5.21 | — | 4.98 | 3.02 | 4.58 | 2.95 |
| Pressure drop at 10 g/L, 26.25 scfm (kPa) | 7.90 | — | 8.04 | 4.72 | 7.72 | 4.73 |
| Pressure drop at 1 g/l soot loading minus clean pressure drop, both at 11.25 scfm (kPa) | 0.62 | — | 0.49 | 0.25 | 0.38 | 0.20 |
| CTE, 25-800° C. ($10^{-7}$° C.$^{-1}$) | 5.2 | 5.6 | 5.5 | 6.4 | 7.9 | 9.5 |
| Modulus of rupture on cellular bar (lbs/in$^2$) | 185 | — | — | — | — | 305 |

TABLE 5

Inventive Examples

| | Example Number | | | | | |
|---|---|---|---|---|---|---|
| | 7 | 8 | 9 | 10 | 11 | 12 |
| Talc A | 39.96 | 40.27 | 39.86 | 40.7 | 40.7 | 40.7 |
| Alumina A | 0 | 10.75 | 19.05 | 0 | 0 | 0 |
| Alumina B | 21.54 | 0 | 0 | 14.8 | 14.8 | 14.8 |
| Aluminum Hydroxide B | 16.35 | 15.83 | 14.01 | 16.0 | 16.0 | 16.0 |
| Boehmite | 0 | 4.95 | 4.99 | 0 | 0 | 0 |
| Kaolin | 0 | 15.83 | 0 | 16.0 | 16.0 | 16.0 |
| Silica | 22.15 | 12.37 | 22.09 | 12.5 | 12.5 | 12.5 |
| Graphite A | 0 | 0 | 0 | 0 | 20.0 | 0 |
| Graphite C | 0 | 40.0 | 30.0 | 0 | 0 | 0 |
| Graphite D | 40.0 | 0 | 0 | 0 | 0 | 0 |
| Potato Starch | 0 | 0 | 0 | 40.0 | 20.0 | 0 |
| Corn Starch | 0 | 0 | 0 | 0 | 0 | 40.0 |
| $R_m$ parameter | −2.75 | −2.95 | −2.75 | −3.31 | −2.68 | −3.21 |
| Total Intrusion (ml/g) | 0.5950 | 0.5385 | 0.5339 | 0.6216 | 0.6561 | 0.5329 |
| % Porosity | 59.8 | 56.6 | 54.5 | 59.4 | 62.8 | 56.5 |
| $d_{10}$ pore size (μm) | 10.8 | 7.9 | 5.0 | 7.0 | 7.2 | 5.0 |
| $d_{50}$ pore size (μm) | 20.7 | 14.6 | 11.0 | 14.6 | 16.0 | 8.6 |
| $d_{90}$ pore size (μm) | 53.8 | 39.3 | 30.4 | 29.2 | 35.5 | 34.5 |
| $(d_{90} - d_{10})/d_{90}$ | 2.08 | 2.15 | 2.31 | 1.52 | 1.77 | 3.42 |
| $(d_{90} - d_{50})/d_{50}$ | 1.60 | 1.69 | 1.76 | 1.00 | 1.22 | 2.99 |
| $(d_{90} - d_{10})/d_{50}$ | 0.48 | 0.46 | 0.55 | 0.52 | 0.55 | 0.42 |
| $P_m$ parameter | 3.55 | 3.55 | 3.69 | 3.41 | 3.42 | 3.43 |
| Pore volume ≧80 μm (ml/g) | 0.0347 | 0.0238 | 0.0182 | 0.0140 | 0.0161 | 0.0170 |
| Pore volume ≧60 μm (ml/g) | 0.0503 | 0.0320 | 0.0246 | 0.0209 | 0.0245 | 0.0255 |
| Pore volume ≧50 μm (ml/g) | 0.0693 | 0.0420 | 0.0315 | 0.0287 | 0.0333 | 0.0340 |
| Pore volume ≧40 μm (ml/g) | 0.0882 | 0.0520 | 0.0383 | 0.0364 | 0.0421 | 0.0424 |
| Pore volume ≧20 μm (ml/g) | 0.3119 | 0.1527 | 0.0939 | 0.1457 | 0.1664 | 0.0895 |
| Pore volume ≧10 μm (ml/g) | 0.5553 | 0.4211 | 0.3042 | 0.4917 | 0.5344 | 0.2115 |
| Pore volume ≧4 μm (ml/g) | 0.5942 | 0.5305 | 0.5023 | 0.5903 | 0.6301 | 0.5091 |
| Pore volume ≧2 μm (ml/g) | 0.5942 | 0.5370 | 0.5217 | 0.6018 | 0.6422 | 0.5287 |
| Percent of total porosity <10 μm | 6.7 | 21.8 | 43.0 | 20.9 | 18.5 | 60.3 |
| Percent of total porosity >10 μm, <50 μm | 81.7 | 70.4 | 51.1 | 74.5 | 76.4 | 33.3 |
| Percent of total porosity >50 μm | 11.6 | 7.8 | 5.9 | 4.6 | 5.1 | 6.4 |
| Diameter (cm) | — | 5.14 | 4.92 | 5.16 | — | 5.08 |
| Length (cm) | — | 15.26 | 15.24 | 15.21 | — | 15.24 |
| Cells per square inch | — | 186 | 188 | 197 | — | 205 |
| Wall thickness ($10^{-3}$ inches) | — | 13.4 | 12.2 | 11.5 | — | 11.7 |
| Filter bulk density (g/cm$^3$) | — | 0.41 | 0.40 | 0.35 | — | 0.39 |
| Clean pressure drop at 11.25 scfm (kPa) | — | 0.37 | 0.43 | 0.40 | — | 0.41 |
| Pressure drop at 1 g/L, 11.25 scfm (kPa) | — | 0.67 | 0.87 | 0.97 | — | 0.72 |

TABLE 5-continued

Inventive Examples

| | Example Number | | | | | |
|---|---|---|---|---|---|---|
| | 7 | 8 | 9 | 10 | 11 | 12 |
| Pressure drop at 5 g/L, 11.25 scfm (kPa) | — | 1.34 | 1.62 | 1.95 | — | 1.37 |
| Pressure drop at 10 g/L, 11.25 scfm (kPa) | — | 2.23 | 2.58 | 3.26 | — | 2.18 |
| Clean pressure drop at 26.25 scfm (kPa) | — | 1.37 | 1.46 | 1.48 | — | 1.44 |
| Pressure drop at 1 g/L, 26.25 scfm (kPa) | — | 2.03 | 2.48 | 2.81 | — | 2.13 |
| Pressure drop at 5 g/L, 26.25 scfm (kPa) | — | 3.69 | 4.34 | 5.29 | — | 3.73 |
| Pressure drop at 10 g/L, 26.25 scfm (kPa) | — | 6.02 | 6.71 | 8.61 | — | 5.83 |
| Pressure drop at 1 g/l soot loading minus clean pressure drop, both at 11.25 scfm (kPa) | — | 0.30 | 0.44 | 0.57 | — | 0.31 |
| CTE, 25-800° C. ($10^{-7}$ °C.$^{-1}$) | 7.8 | 7.5 | 5.2 | 4.2 | 3.2 | 4.3 |
| Modulus of rupture on cellular bar (lbs/in$^2$) | — | 409 | 247 | 253 | — | 236 |

TABLE 6

Inventive Examples

| | Example Number | | | | | |
|---|---|---|---|---|---|---|
| | 13 | 14 | 15 | 16 | 17 | 18 |
| Talc A | 0 | 0 | 0 | 0 | 0 | 40.7 |
| Talc B | 40.7 | 40.7 | 0 | 0 | 40.7 | 0 |
| Talc C | 0 | 0 | 40.7 | 40.7 | 0 | 0 |
| Alumina B | 14.8 | 14.8 | 14.8 | 14.8 | 14.8 | 14.8 |
| Aluminum Hydroxide B | 16.0 | 16.0 | 16.0 | 16.0 | 16.0 | 16.0 |
| Kaolin | 16.0 | 16.0 | 16.0 | 16.0 | 16.0 | 16.0 |
| Silica | 12.5 | 12.5 | 12.5 | 12.5 | 12.5 | 12.5 |
| Graphite A | 0 | 0 | 0 | 0 | 0 | 30.0 |
| Graphite C | 60.0 | 0 | 60.0 | 0 | 35.0 | 0 |
| Graphite D | 0 | 60.0 | 0 | 60.0 | 0 | 0 |
| Potato Starch | 0 | 0 | 0 | 0 | 0 | 20.0 |
| $R_m$ parameter | −3.23 | −3.12 | −2.93 | −2.82 | −2.67 | −2.91 |
| Total Intrusion (ml/g) | 0.6640 | 0.6709 | 0.6775 | 0.6081 | 0.5989 | 0.9012 |
| % Porosity | 62.2 | 58.4 | 61.3 | 55.7 | 60.0 | 69.7 |
| $d_{10}$ pore size (μm) | 6.2 | 3.5 | 4.1 | 3.7 | 4.6 | 7.6 |
| $d_{50}$ pore size (μm) | 11.7 | 6.3 | 9.1 | 7.8 | 12.3 | 18.6 |
| $d_{90}$ pore size (μm) | 21.5 | 15.7 | 25.7 | 38.6 | 29.3 | 51.7 |
| $(d_{90} - d_{10})/d_{50}$ | 1.32 | 1.96 | 2.37 | 4.48 | 2.01 | 2.37 |
| $(d_{90} - d_{50})/d_{50}$ | 0.85 | 1.51 | 1.81 | 3.96 | 1.38 | 1.78 |
| $(d_{50} - d_{10})/d_{50}$ | 0.47 | 0.45 | 0.55 | 0.52 | 0.63 | 0.59 |
| $P_m$ parameter | 3.04 | 3.21 | 3.29 | 3.70 | 3.52 | 3.34 |
| Pore volume ≧80 μm (ml/g) | 0.0092 | 0.0157 | 0.0141 | 0.0270 | 0.0139 | 0.0271 |
| Pore volume ≧60 μm (ml/g) | 0.0141 | 0.0190 | 0.0211 | 0.0369 | 0.0183 | 0.0405 |
| Pore volume ≧50 μm (ml/g) | 0.0192 | 0.0226 | 0.0290 | 0.0489 | 0.0233 | 0.0651 |
| Pore volume ≧40 μm (ml/g) | 0.0243 | 0.0261 | 0.0368 | 0.0609 | 0.0283 | 0.0898 |
| Pore volume ≧20 μm (ml/g) | 0.0791 | 0.0490 | 0.0930 | 0.1343 | 0.0874 | 0.3517 |
| Pore volume ≧10 μm (ml/g) | 0.4291 | 0.1154 | 0.2974 | 0.2499 | 0.3881 | 0.6650 |
| Pore volume ≧4 μm (ml/g) | 0.6446 | 0.5598 | 0.6093 | 0.6079 | 0.5556 | 0.7780 |
| Pore volume ≧2 μm (ml/g) | 0.6575 | 0.6574 | 0.6631 | 0.6081 | 0.5891 | 0.7962 |
| Percent of total porosity <10 μm | 35.4 | 82.8 | 56.1 | 58.9 | 35.2 | 26.2 |
| Percent of total porosity >10 μm, <50 μm | 61.7 | 13.8 | 39.6 | 33.1 | 60.9 | 66.6 |
| Percent of total porosity >50 μm | 2.9 | 3.4 | 4.3 | 8.0 | 3.9 | 7.2 |
| Diameter (cm) | 5.16 | 5.35 | 5.23 | 5.39 | — | — |
| Length (cm) | 15.22 | 15.23 | 15.20 | 15.22 | — | — |
| Cells per square inch | 186 | 190 | 183 | 202 | — | — |
| Wall thickness ($10^{-3}$ inches) | 11.7 | 12.6 | 14.4 | 11.3 | — | — |
| Filter bulk density (g/cm$^3$) | 0.32 | 0.38 | 0.39 | 0.38 | — | — |
| Clean pressure drop at 11.25 scfm (kPa) | 0.50 | 0.53 | 0.47 | 0.40 | — | — |
| Pressure drop at 1 g/L, 11.25 scfm (kPa) | 0.92 | 0.86 | 0.90 | 0.70 | — | — |
| Pressure drop at 5 g/L, 11.25 scfm (kPa) | 1.93 | 1.68 | 1.85 | 1.18 | — | — |
| Pressure drop at 10 g/L, 11.25 scfm (kPa) | 3.26 | 2.76 | 3.09 | 1.72 | — | — |
| Clean pressure drop at 26.25 scfm (kPa) | 1.78 | 1.76 | 1.62 | 1.40 | — | — |
| Pressure drop at 1 g/L, 26.25 scfm (kPa) | 2.71 | 2.54 | 2.61 | 2.11 | — | — |
| Pressure drop at 5 g/L, 26.25 scfm (kPa) | 5.28 | 4.50 | 5.01 | 3.46 | — | — |
| Pressure drop at 10 g/L, 26.25 scfm (kPa) | 8.64 | 7.13 | 8.18 | 5.04 | — | — |
| Pressure drop at 1 g/l soot loading minus clean pressure drop, both at 11.25 scfm (kPa) | 0.42 | 0.33 | 0.43 | 0.30 | — | — |
| CTE, 25-800° C. ($10^{-7}$ °C.$^{-1}$) | 6.4 | 5.1 | 7.3 | — | 6.3 | — |
| Modulus of rupture on cellular bar (lbs/in$^2$) | 270 | 238 | 276 | 264 | 330 | — |

TABLE 7

Inventive Examples

| | Example Number | | | | |
|---|---|---|---|---|---|
| | 19 | 20 | 21 | 22 | 23 |
| Talc A | 40.7 | 40.7 | 40.7 | 40.7 | 40.7 |
| Alumina B | 14.8 | 14.8 | 14.8 | 14.8 | 14.8 |
| Aluminum Hydroxide B | 16.0 | 16.0 | 16.0 | 16.0 | 16.0 |
| Kaolin | 16.0 | 16.0 | 16.0 | 16.0 | 16.0 |
| Silica | 12.5 | 12.5 | 12.5 | 12.5 | 12.5 |
| Graphite A | 40.0 | 0 | 0 | 0 | 0 |
| Potato Starch | 20.0 | 0 | 0 | 0 | 0 |
| Coconut shell flour | 0 | 36.0 | 0 | 0 | 0 |
| Walnut shell flour | 0 | 0 | 36.0 | 0 | 0 |
| Polyacrylate beads A | 0 | 0 | 0 | 30.0 | 0 |
| Polyacrylate beads B | 0 | 0 | 0 | 0 | 30.0 |
| $R_m$ parameter | −3.13 | −3.34 | −3.18 | −3.70 | −3.83 |
| Total Intrusion (ml/g) | 0.8301 | 0.5862 | 0.6392 | 0.4881 | 0.5473 |
| % Porosity | 70.5 | 63.7 | 61.02 | 55.0 | 57.9 |
| $d_{10}$ pore size (μm) | 7.0 | 4.9 | 4.9 | 2.4 | 3.6 |
| $d_{50}$ pore size (μm) | 17.4 | 9.4 | 12.1 | 5.4 | 10.7 |
| $d_{90}$ pore size (μm) | 36.8 | 15.4 | 23.4 | 17.0 | 23.9 |
| $(d_{90} − d_{10})/d_{50}$ | 1.71 | 1.13 | 1.52 | 2.69 | 1.90 |
| $(d_{90} − d_{50})/d_{50}$ | 1.12 | 0.64 | 0.93 | 2.13 | 1.23 |
| $(d_{50} − d_{10})/d_{50}$ | 0.60 | 0.48 | 0.59 | 0.56 | 0.67 |
| $P_m$ parameter | 3.28 | 2.87 | 3.33 | 3.75 | 3.59 |
| Pore volume ≥80 μm (ml/g) | 0.0244 | 0.0108 | 0.0140 | 0.0091 | 0.0123 |
| Pore volume ≥60 μm (ml/g) | 0.0379 | 0.0151 | 0.0190 | 0.0126 | 0.0172 |
| Pore volume ≥50 μm (ml/g) | 0.0549 | 0.0179 | 0.0245 | 0.0157 | 0.0219 |
| Pore volume ≥40 μm (ml/g) | 0.0718 | 0.0207 | 0.0300 | 0.0188 | 0.0266 |
| Pore volume ≥20 μm (ml/g) | 0.2870 | 0.0405 | 0.0890 | 0.0393 | 0.0750 |
| Pore volume ≥10 μm (ml/g) | 0.6834 | 0.2474 | 0.4050 | 0.1086 | 0.3017 |
| Pore volume ≥4 μm (ml/g) | 0.7912 | 0.5493 | 0.5975 | 0.3216 | 0.4840 |
| Pore volume ≥2 μm (ml/g) | 0.8082 | 0.5761 | 0.6252 | 0.4579 | 0.5230 |
| Percent of total porosity <10 μm | 17.7 | 57.8 | 36.6 | 77.8 | 44.9 |
| Percent of total porosity >10 μm, <50 μm | 75.7 | 39.1 | 59.5 | 19.0 | 51.1 |
| Percent of total porosity >50 μm | 6.6 | 3.1 | 3.8 | 3.2 | 4.0 |
| CTE, 25-800° C. ($10^{-7}$ °$C.^{-1}$) | 6.1 | — | 8.3 | — | — |
| Modulus of rupture on cellular bar (lbs/in$^2$) | — | — | — | — | — |

TABLE 8

Inventive Examples

| | Example Number | | | |
|---|---|---|---|---|
| | 24 | 25 | 26 | 27 |
| Talc A | 40.7 | 40.7 | 40.7 | 40.7 |
| Alumina A | 16.0 | 16.0 | 0 | 0 |
| Alumina B | 0 | 0 | 16.0 | 16.0 |
| Aluminum Hydroxide A | 16.0 | 16.0 | 0 | 0 |
| Aluminum Hydroxide B | 0 | 0 | 16.0 | 16.0 |
| Kaolin | 16.0 | 16.0 | 16.0 | 16.0 |
| Silica | 12.5 | 12.5 | 12.5 | 12.5 |
| Graphite E | 20.0 | 40.0 | 40.0 | 60.0 |
| $R_m$ parameter | −2.78 | −3.23 | −2.86 | −3.30 |
| Total Intrusion (ml/g) | 0.4820 | 0.6037 | 0.4759 | 0.5966 |
| % Porosity | 55.2 | 61.1 | 53.2 | 60.8 |
| $d_{10}$ pore size (μm) | 8.2 | 10.1 | 7.8 | 8.8 |
| $d_{50}$ pore size (μm) | 14.6 | 16.0 | 12.5 | 13.6 |
| $d_{90}$ pore size (μm) | 29.8 | 32.2 | 28.4 | 29.8 |
| $(d_{90} − d_{10})/d_{50}$ | 1.48 | 1.38 | 1.65 | 1.55 |
| $(d_{90} − d_{50})/d_{50}$ | 1.04 | 1.02 | 1.28 | 1.19 |
| $(d_{50} − d_{10})/d_{50}$ | 0.44 | 0.37 | 0.38 | 0.35 |
| $P_m$ parameter | 3.50 | 3.16 | 3.48 | 3.07 |
| Pore volume ≥80 μm (ml/g) | 0.0150 | 0.0185 | 0.0161 | 0.0188 |
| Pore volume ≥60 μm (ml/g) | 0.0208 | 0.0268 | 0.0210 | 0.0241 |
| Pore volume ≥50 μm (ml/g) | 0.0257 | 0.0340 | 0.0260 | 0.0303 |
| Pore volume ≥40 μm (ml/g) | 0.0332 | 0.0446 | 0.0318 | 0.0372 |
| Pore volume ≥20 μm (ml/g) | 0.0966 | 0.1471 | 0.0786 | 0.1052 |
| Pore volume ≥10 μm (ml/g) | 0.3988 | 0.5452 | 0.3442 | 0.4851 |
| Pore volume ≥4 μm (ml/g) | 0.4716 | 0.5941 | 0.4728 | 0.5942 |
| Pore volume ≥2 μm (ml/g) | 0.4787 | 0.5983 | 0.4752 | 0.5961 |
| Percent of total porosity <10 μm | 17.3 | 9.7 | 27.7 | 18.7 |

TABLE 8-continued

Inventive Examples

| | Example Number | | | |
|---|---|---|---|---|
| | 24 | 25 | 26 | 27 |
| Percent of total porosity >10 μm, <50 μm | 77.4 | 84.7 | 66.9 | 76.2 |
| Percent of total porosity >50 μm | 5.3 | 5.6 | 5.5 | 5.1 |
| Diameter (cm) | — | — | 5.07 | — |
| Length (cm) | — | — | 15.33 | — |
| Cells per square inch | — | — | 196 | — |
| Wall thickness ($10^{-3}$ inches) | — | — | 13.7 | — |
| Filter bulk density (g/cm$^3$) | — | — | 0.46 | — |
| Clean pressure drop at 11.25 scfm (kPa) | — | — | 0.50 | — |
| Pressure drop at 1 g/L, 11.25 scfm (kPa) | — | — | 1.18 | — |
| Pressure drop at 5 g/L, 11.25 scfm (kPa) | — | — | 2.11 | — |
| Pressure drop at 10 g/L, 11.25 scfm (kPa) | — | — | 3.30 | — |
| Clean pressure drop at 26.25 scfm (kPa) | — | — | 1.78 | — |
| Pressure drop at 1 g/L, 26.25 scfm (kPa) | — | — | 3.32 | — |
| Pressure drop at 5 g/L, 26.25 scfm (kPa) | — | — | 5.74 | — |
| Pressure drop at 10 g/L, 26.25 scfm (kPa) | — | — | 8.84 | — |
| Pressure drop at 1 g/l soot loading minus clean pressure drop, both at 11.25 scfm (kPa) | — | — | 0.68 | — |
| CTE, 25-800° C. ($10^{-7}$ ° C.$^{-1}$) | 5.5 | 6.0 | 5.3 | 7.4 |
| Modulus of rupture on cellular bar (lbs/in$^2$) | — | — | — | — |

It is claimed:

1. A method of making a cordierite structure for use in a diesel particulate filter, the method comprising:

forming a mixture of cordierite-forming raw materials, a pore former and organic components, the cordierite-forming raw materials including talc, silica, and an alumina-forming source, each defining a median particle size, wherein the talc median particle size, the alumina-forming source median particle size, the amount of pore former, and the pore former median particle size satisfy the relationship $R_m \leq -2.64$, where $R_m$ is equal to [−0.102(talc median particle diameter)+0.001466(talc median particle diameter)$^2$−0.0491((weight percent super-addition of pore forming agent)/(density of pore forming agent))−0.00762(median particle diameter of pore forming agent)+0.0000760(median particle diameter of pore forming agent)$^2$−0.0562(median particle diameter of the alumina-forming source)], wherein the median particle diameter is in units of micrometers;

shaping the mixture into a green structure; and, firing the green structure at a temperature and for a time to produce a fired structure having a CTE (25-800° C.) of less than 13×10$^{-7}$/° C., a bulk filter density of less than 0.60 g/cm$^3$, a median pore diameter, $d_{50}$, of less than 25 micrometers, a porosity and pore size distribution that satisfy the relationship $P_m \leq 3.75$, wherein $P_m$ is equal to $10.2474\{1/[(d_{50})^2(\% \text{ porosity}/100)]\}+0.0366183(d_{90})-0.00040119(d_{90})^2+0.468815(100/\% \text{ porosity})^2+0.0297715(d_{50})+1.61639(d_{50}-d_{10})/d_{50}$, wherein $d_{10}$, and $d_{90}$ are pore diameters in units of micrometers at 10% and 90% of the pore size distribution on a volumetric basis, and $d_{10}<d_{50}<d_{90}$.

2. The method of claim 1 wherein the talc is platy and has a median particle size of between 5 and 35 micrometers.

3. The method of claim 1 wherein the median particle size of the silica is between 1 and 35 micrometers.

4. The method of claim 1 wherein the median particle size of the alumina-forming source is between 1 and 18 micrometers.

5. The method of claim 4 wherein the alumina-forming source is selected from the group consisting of corundum, aluminum hydroxide, aluminum oxide hydroxide (such as boehmite), and so-called transition aluminas such as gamma-alumina and rho-alumina.

6. The method of claim 1 wherein the pore former has a median particle size of between 5 and 90 micrometers.

7. The method of claim 6 wherein the pore former has a median particle size of between 7 and 60 micrometers.

8. The method of claim 7 wherein the pore former has a median particle size of between 20 and 50 micrometers.

9. The method of claim 1 wherein the pore former is selected from the group consisting of carbon, coke, graphite, starch, flour, cellulose, polyacrylate, polyethylene, or polystyrene.

10. The method of claim 1 wherein the organic components comprise 2% to 10% by weight of methyl cellulose, and 0.5% to 2% by weight sodium stearate.

11. The method of claim 10 wherein the organic components comprise 3% to 6% by weight methyl cellulose and 0.6% to 1% by weight sodium stearate.

12. The method of claim 1 wherein the shaping is by extrusion.

13. The method of claim 12 wherein the mixture is shaped through a die into a honeycomb body having an inlet and outlet end or face, and a multiplicity of cells extending from the inlet end to the outlet end, the cells having porous walls.

14. The method of claim 1 wherein the CTE of the honeycomb structure is less than 10×10$^{-7}$/° C.

15. The method of claim 14 wherein the CTE of the honeycomb structure is less than 7×10$^{-7}$/° C.

16. The method of claim 1 wherein the CTE of the honeycomb structure is greater than 4×10$^{-7}$/° C. and less than 13×10$^{-7}$/° C.

17. The method of claim 16 wherein the CTE of the honeycomb structure is greater than 4×10$^{-7}$/° C. and less than 10×10$^{-7}$/° C.

18. The method of claim 17 wherein the CTE of the honeycomb structure is greater than 4×10$^{-7}$/° C. and less than 7×10$^{-7}$/° C.

19. The method of claim 1 wherein the honeycomb structure has $P_m \leq 3.50$.

20. The method of claim 19 wherein the honeycomb structure has $P_m \leq 3.30$.

21. The method of claim 1 wherein the firing is at 1390° C. to 1400° C. for 4 to 25 hours.

22. The method of claim 1 further comprising the step of forming a wall-flow filter.

23. The method of claim 22 wherein in the formation of a wall-flow filter the cells of the honeycomb structure are end plugged at the inlet or outlet end to form a checkered pattern.

24. The method of claim 1 wherein the CTE of the honeycomb structure is less than $6 \times 10^{-7}$/° C.

25. The method of claim 1 wherein the pore former comprises graphite and starch.

26. The method of claim 1 wherein the pore former comprises graphite and potato starch.

27. The method of claim 1, wherein the mixture of cordierite-forming raw materials includes kaolin.

28. A method of making a cordierite structure, comprising the steps of:
    forming a mixture of cordierite-forming raw materials, a pore former and organic components, the cordierite-forming raw materials including talc, silica, and an alumina-forming source, wherein the pore former comprises a combination of graphite and starch;
    shaping the mixture into a green honeycomb structure; and
    firing the green structure at a temperature and for a time to produce a fired honeycomb structure;
    wherein the fired structure further comprises: a CTE (25-800° C.) of less than $13 \times 10^{31}$ $^7$/° C., a median pore diameter, $d_{50}$, of less than 25 μm; a porosity of greater than 53%; a narrow pore size distribution with a value of $(d_{50}-d_{10})/d_{50}$ not greater than 0.6; and a value of $d_{90}$ less than 40 μm wherein $d_{10}$, and $d_{90}$ are pore diameters at 10% and 90% of the pore size distribution on a volumetric basis, and $d_{10} < d_{50} < d_{90}$;
    wherein the fired structure comprises a pore size distribution that satisfies the relationship $P_m \leq 3.75$, wherein $P_m$ is equal to $10.2474 \{1/[(d_{50})^2(\% \text{ porosity}/100)]\} + 0.0366183(d_{90}) + 0.00040119 (d_{90})^2 + 0.468815(100/\% \text{ porosity})^2 + 0.0297715(d_{50}) + 1.61639(d_{50}-d_{10})/d_{50}$, wherein $d_{10}$, and $d_{90}$ are pore diameters in units of micrometers at 10% and 90% of the pore size distribution on a volumetric basis, and $d_{10} < d_{50} < d_{90}$.

29. The method of claim 28 wherein the starch comprise a potato starch.

30. The method of claim 28, wherein the mixture of cordierite-forming raw materials includes kaolin.

* * * * *

UNITED STATES PATENT AND TRADEMARK OFFICE
CERTIFICATE OF CORRECTION

PATENT NO. : 7,494,613 B2
APPLICATION NO. : 11/651814
DATED : February 24, 2009
INVENTOR(S) : Gregory Albert Merkel et al.

It is certified that error appears in the above-identified patent and that said Letters Patent is hereby corrected as shown below:

| Col. | Line | |
|---|---|---|
| 20 | 27 | "boebmite" should be -- boehmite --. |
| 21 | 4 | "1400° C" should be -- 1440° C --. |
| 22 | 5 | "$13\times10^{31\ 7}/°$ C" should be -- $13\times10^{-7}/°$ C --. |
| 22 | 15 | "$0.0366183(d_{90})+$" should be -- $0.0366183(d_{90})-$ --. |

Signed and Sealed this

Twenty-eighth Day of July, 2009

JOHN DOLL
*Acting Director of the United States Patent and Trademark Office*